US 6,821,067 B1

(12) United States Patent
Von Loehr

(10) Patent No.: US 6,821,067 B1
(45) Date of Patent: Nov. 23, 2004

(54) PICKUP TRUCK RAIL BED COVER

(76) Inventor: Steve Von Loehr, 47 Borad St., Sutter Creek, CA (US) 95685

( * ) Notice: Subject to any disclaimer, the term of this patent is extended or adjusted under 35 U.S.C. 154(b) by 94 days.

(21) Appl. No.: 10/141,646

(22) Filed: May 7, 2002

Related U.S. Application Data

(60) Provisional application No. 60/288,926, filed on May 7, 2001.

(51) Int. Cl.[7] ............................................. B62D 33/023
(52) U.S. Cl. ........................ 410/97; 410/106; 410/110; 296/50; 24/68 CD
(58) Field of Search ............... 296/50, 57.1; 24/68 CD, 24/115 K, 265 CD; 410/97, 105, 108, 110, 115, 116, 106

(56) References Cited

U.S. PATENT DOCUMENTS

| | | | | |
|---|---|---|---|---|
| 3,043,550 A | * | 7/1962 | Garbarino et al. | 410/110 |
| 3,357,670 A | * | 12/1967 | Larson | 410/106 |
| 3,960,091 A | * | 6/1976 | Ehlert | 410/96 |
| 4,253,785 A | * | 3/1981 | Bronstein | 410/110 |
| 4,607,991 A | * | 8/1986 | Porter | 410/110 |
| 4,650,382 A | * | 3/1987 | Johnson | 410/110 |
| 4,818,162 A | * | 4/1989 | Zukowski et al. | 410/116 |
| 4,850,770 A | * | 7/1989 | Millar, Jr. | 410/110 |
| 4,936,724 A | * | 6/1990 | Dutton | 410/110 |
| 5,050,924 A | * | 9/1991 | Hansen | 296/100.15 |
| 5,169,201 A | * | 12/1992 | Gower | 296/39.2 |
| 5,328,310 A | * | 7/1994 | Lockney | 410/97 |
| 5,364,211 A | * | 11/1994 | Lund | 410/108 |
| 5,372,397 A | * | 12/1994 | Arndt | 296/39.2 |
| 5,443,342 A | * | 8/1995 | Huang | 410/151 |
| 5,738,471 A | * | 4/1998 | Zentner et al. | 410/110 |
| 5,876,167 A | * | 3/1999 | Selby | 410/97 |
| 5,987,711 A | * | 11/1999 | Parsons | 24/130 |
| 6,270,301 B1 | * | 8/2001 | Dunlop | 410/115 |
| 6,565,300 B2 | * | 5/2003 | Herring | 410/102 |

* cited by examiner

Primary Examiner—D. Glenn Dayoan
Assistant Examiner—Paul Chenevert
(74) Attorney, Agent, or Firm—Edward P. Dutkiewicz

(57) ABSTRACT

A pickup truck has a bed and a pair of walls each with an inside and an outside surface and an upper rail. An upper rail cover, formed of solid reinforced steel, is coupled to the upper rail. An outside edge of the upper rail cover has a plurality of downward tie hooks. A plurality of ropes retain an object in the bed by looping and tying to the tie hooks.

1 Claim, 4 Drawing Sheets

PICKUP TRUCK RAIL BED COVER

RELATED APPLICATION

The present application is a continuation-in-part of pending Provisional Patent Application Ser. No. 60/288,926 filed May 7, 2001.

BACKGROUND OF THE INVENTION

1. Field of the Invention

The present invention relates to beds of pickup trucks and, more particularly, is concerned with the metal plate cover for being attached over the upper edges and the sides and tailgate of a pickup truck bed for providing an external tie down means.

Pickup trucks are the largest selling vehicles in the United States. Their popularity is a function of how they look, how the owner feels about his vehicle and the work that pickup trucks can accomplish. Customization of pickup trucks is routine as owners add their own personalities to their truck.

One of the most popular ways to customize a tuck is to add a bed liner, a tool box or side rails with multiple attachment points. Attachment points sometimes come with the vehicle from the manufacturer, but more often are an aftermarket item.

Typical manufacturer attachment means are eye bolts attached to the up-facing four corners of the bed. Other typical aftermarket attachments means are hook or eyes on the inside of a rail attached to the bed. There are significant drawbacks to the current tie down means.

With eyes, a long rope has to be threaded through each eye, a time consuming task which reduces the productivity of the truck operator. With internal tie down means, the useful interior volume of the truck bed is reduced not only by the extension of the attachment means themselves from both sides of the bed, but also additional space must be allowed to manipulate the rope in around and/or through said tie down means.

An external tie down means would allow the full size of the truck bed to be productively used. If the external tie down means were also contoured and complimentary to the natural lines of the truck body, then the installation would be attractive, masculine and functional.

One manufacturer bolts a double ended cleat onto the exterior side of the truck bed. The cleat extends outward such that it could catch passersby, whether human or non-human. An exterior attachment means that had a smooth curve from outside to inside as an integral part of a reinforcing rail would allow full utilization of the truck bed while minimizing the chance of hooking passersby.

Manufacturers' tie down means are attached to a single point of a thin piece of sheet metal. Accordingly, the load that such tie downs can secure is limited by the strength of a single tie down point. External tie down means that were an integral part of a rigid rail with a plurality of attachment points from the rail to the bed would be preferred.

Single point attachment means concentrate the stress at the point of attachment. When a load moves, for example when going over a bump in the road, high stress is placed on said attachment point. A design which spread the load across a broad area would be inherently more resistant to stress-caused failure than a design with the load focused on a narrow, highly stressed area.

Of particular concern is the strength of the tailgate. This piece is light weight and normally not designed for tie down means. Large or unwieldy loads need to be tied down in more than just two directions. A tailgate skin that reinforced the manufacturers' tailgate could be used to tie down unwieldy loads in a third dimension, thus securing said load more efficiently.

2. Description of the Prior Art

Tie down covers have been described in the prior art. However, none of the prior art devices disclose the unique features of the present invention.

U.S. Pat. No. 4,850,770 issued Jul. 25, 1989, to Millar, Jr. discloses a tie-down anchor attachable to any location along the side rail of a pickup bed, which anchor includes an L-shaped member having a horizontal leg which extends outwardly across the top of the side rail, and a vertical leg which extends downward to the inside of the side rail. A tie-down connection member, such as a hook, is attached to the horizontal leg extending upwardly. A hole is formed in the horizontal leg of the L-shaped member between the tie-down connection member and the vertical leg. A U-shaped clamping member has two legs, which define a vertical slot, so that the clamping member may straddle the lip of the side rail, with one leg outside and the other leg beneath the side rail and inside the side rail lip. A vertical hole is formed through the outer leg of the clamping member. A threaded bolt extends through the hole in the horizontal leg of the L-shaped member, through the hole in the outer leg of the clamping member, and is threadingly engaged, so that when the bolt is tightened, the side rail is tightly clamped between the horizontal leg of the L-shaped member and the upper surface of the inner leg of the clamping member, while forcing the inner surface of the vertical leg of the L-shaped member tightly against the outer surface of the clamping member.

U.S. Pat. No. 5,443,342, issued Aug. 22, 1995, to Hamilton discloses a tie-down device which is removably securable without tools to an inside, downwardly oriented edge of the inner sidewalls of a pickup truck bed. The device has a stationary portion with an upwardly oriented edge of the inner sidewalls of a pickup truck bed. The device has a stationary portion with an upwardly oriented front lip which inserts under the edge of the inner sidewall and has a loop connected to the front lip by means of a "U" shaped valley so that the loop extends upward on the inside of the truck bed. A movable portion which movably engages the front loop can first be moved upward in order to position the device so that the outwardly oriented edge is inserted in a gap formed between the front lip and a wedge shaped bumper provided on the movably portion. The movable portion can then be moved downward to secure the device to the pickup truck by wedging the downwardly oriented edge between the bumper and between a vertical face of the front lip. The front lip is provided with a rubberized coating to prevent the device from scratching the finish of the truck bed.

U.S. Pat. No. 5,987,711 issued Nov. 23, 1999, to Parsons discloses a rope clamp which is suitable either for use to hang adjustably an article suspended by a rope, or to act as an adjustable tie down. The clamp has a clamping rope channel between a pair of parallel plates. Clamping ribs are located in the rope channel to grip the rope frictionally and to narrow the channel towards it base. One plate of the pair narrows towards one end to leave exposed parts of an inner face on the other plate. Guides to maintain the rope in the rope channel are located on the exposed parts.

U.S. Pat. No. 4,607,991 issued Aug. 26, 1986 to Porter discloses a self-latching tie down or bolt down anchor for use in securing loads to open truck beds. The anchor is intended for installation in the cavity commonly provided in the bed or side walls of pickup truck to receive the lower end of the support post of a rack.

U.S. Pat. No. 5,738,471 issued Apr. 14, 1998 to Zentner et al. discloses a cargo tie down assembly for disposition in the stake opening of a pickup truck or similar vehicle which facilitates ready installation, secure mounting and easy removal. The tie down assembly includes a plastic base member having a flange which overlies the stake opening on the truck bed rail and a centering projection depending from a flange which is substantially complementary to the size and shape of the stake opening and centers the member therewithin. The tie down also includes an integrally formed eyelet and flange member having an elongate threaded member which receives a conventional expandable toggle assembly. A through opening in the flange member receives the toggle and threaded member and a split collar on the flange member allows expansion of the toggle and its retention under the rail of the truck.

U.S. Pat. No. 4,818,162 issued Apr. 4, 1989 to Zukowski et al. discloses a tie down device for securing an object to a cargo bed comprising a substantially channel-shaped structure which removably mounts along a side of the bed and is infinitely adjustable there along. The device includes a lower hook which wraps around the bottom surface of the bed adjacent the side, an engagement structure which engages the top portion of the bed to facilitate retention of the device on the bed, and a coupling which receives and engages a chain or the like to facilitate holding the object on the bed.

U.S. Pat. No. 4,650,382 issued Mar. 17, 1987, to Johnson discloses an elongated unitary tie down rail adapted to fit the top ledge of the sidewall of a truck bed, including a bottom flange and an upright flange formed at an acute angle. The top portion of the upright flange terminates in an enlarge elongated rod portion, and a plurality of longitudinally spaced slots are formed in the upright flange immediately below the rod portion to receive tie down members for securing a load within the truck bed.

U.S. Pat. No. 3,960,091 issued Jun. 1, 1976 to Ehlert discloses a rope hook mount for attachment to the body of a vehicle described as having a mounting flange with a face conforming generally to the contour of the portion of the vehicle upon which the mount is to be secured. The flange includes a raised portion integral therewith and extending outwardly away from the face of the flange. An aperture is formed in the raise portion and an elongated lip member extends inwardly from the raised portion toward the aperture. The lip member has an outer surface which is generally flush with the outer surface of the raised portion and an inner surface spaced from the face of the flange so that a rope or the like may be looped around the lip member and retained in position by both the lip member and the walls of the aperture.

Other variations of tie down means include interior hooks at the four corners of the pickup truck bed.

While these tie down means may be suitable for the purposes or which they were designed, they do not solve the current problems faced by the pickup truck user.

The prior art tie down devices operate inside the truck bed or on top of the truck rails. Interior tie down means reduce the available payload space in the truck because space must be allowed to thread and unthread the tie down rope through the interior eyes and hooks. Top mounted tie down means must take the complete instantaneous stress of the load. Pickup truck owners are very particular about how their trucks appear. Top mounted tie down means are considered unsightly.

Some tie down means use closed eyes for engaging the tie down rope. The eyes must be threaded then unthreaded as loads are secured and unsecured. Excess time spent in securing and unsecuring loads reduces the productivity of the truck and its operator.

Many pickup truck owners also use the bed of the pickup truck to hold a camper shell. Tie down devices with interior hooks and eyes must be removed before installing the camper shell. This is a time consuming step.

There is a need for a tie down device that is convenient to use, fast to use, strong enough to function effectively, safe to the user and passersby, attractive to look at and can be permanently installed without regard to the ultimate uses of the pickup truck.

SUMMARY OF THE INVENTION

The present invention discloses a metal plate cover which runs around and is complementarity sized and shaped as the top surface of the sizes of the pickup bed of a pickup truck. The cover is attached to both the sides and tailgate of the pickup truck bed. The cover is attached by attachment means to the upper surface of the sides and optionally the tailgate of the pickup truck and provides external and downwardly extending tie down hooks spaced apart around the periphery of said cover.

An object of the present invention is to provide an attractive cover for the upper sides of the bed of a pickup truck in order to provide protection to the rails of the pickup truck. Another object of the present invention is to provide a cover which is attached to the top side of the sides of the pickup truck so as to provide tie down hooks around the outer periphery of the pickup truck bed. A further object of the present invention is to provide a stiffening and structural reinforcing means and protection of the pickup bed for the upper sides of the bed of the pickup truck along with the inside face of the tailgate of the pickup truck. A further object of the present invention is to reduce the point stress on the tie down means. Another object of the present invention is to accommodate camper shells interior to the truck bed without necessitating removal of the tie down means.

A final object of the invention is to provide a pickup truck having a bed and a pair of walls each with an inside and an outside surface and an upper rail; an upper rail cover, formed of solid reinforced steel, coupled to the upper rail; an outside edge of the upper rail cover having a plurality of downward tie hooks; and a plurality of ropes to retain an object in the bed by looping around and tying to the tie hooks.

The foregoing and other objects and advantages will appear from the description to follow. In the description, reference is made to the accompanying drawings, which form a part hereof, and in which is shown, by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts through the several views.

BRIEF DESCRIPTION OF THE DRAWINGS

In order that the invention may be more fully understood, it will now be described, by way of example, with reference to the accompanying drawings in which.

List of Reference Numerals

Figure 1:
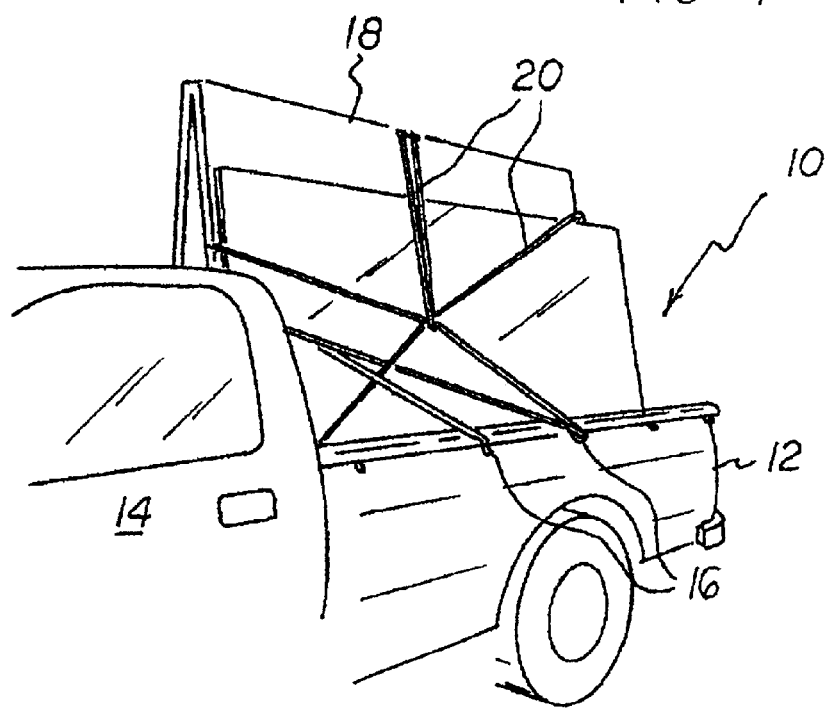
FIGS. 1, 2, 3 and 4 are illustrations of the present invention in operative connection.

With regard to reference numerals used, the following numbering is used through the drawings.

10 present invention
11 inside side of pickup truck
12 bed of pickup truck
13 outside side of pickup truck
14 pickup truck
15 bed liner
16 tie down hooks
 (16-s side; 16-t tailgate; 16-f front)
18 object
20 rope
22 attachment means
23 counter sunk rail-to-bed attachment means
24 contoured edge
25 optional reinforcing bracket
26 tailgate skin
28 utility box
30 retention curve
32 lower outside edge of present invention 10
34 welded attachment point of tie down hook 16 to present invention 10
36 tailgate
38 camper shell

DESCRIPTION OF THE PREFERRED EMBODIMENTS

In order that the invention may be more fully understood, it will now be described, by way of example, with reference to the accompanying drawings in which FIGS. 1 through 4 illustrate the present invention wherein a substantially rigid plate cover providing the tie down hooks for the sides of a pickup truck bed is disclosed.

Turning to FIG. 1, shown therein is an illustration of the present invention 10 shown in operative connection onto the bed 12 of pickup truck 14. Shown are plurality of tie down hooks 16 disposed around the outer perimeter in a spaced-apart relationship onto the upper edge of the sides of the bed of the pickup truck. Also shown is an object 18 being held in place by a plurality of tie-down ropes 20 which are fasten around tie down hooks 16.

Figure 2:
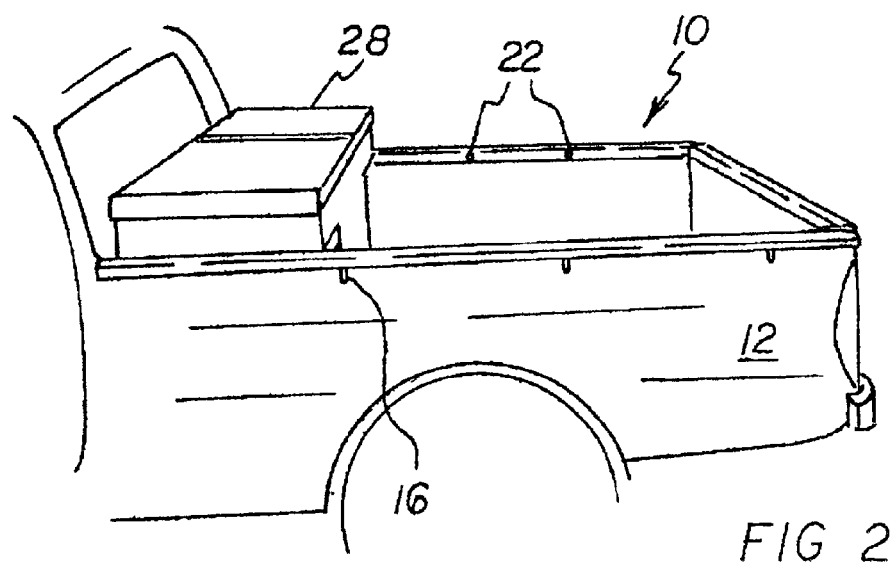

Turning to FIG. 2, therein is shown an illustration of the present invention 10 shown in operative connection onto the bed 12 of a pickup truck. Shown are a plurality of tie down hooks 16 disposed about the outer perimeter in a spaced apart relationship onto the upper edge of the sides of the pickup truck. Also shown is a utility box 28 disposed in the pickup truck bed 12 in a conventional manner. Also shown are a plurality of means 22 which are used as attachment means for connecting the present invention 10 to the upper edges of the pickup truck bed as would be done in the standard manner by one skilled in the art which could be rivets, sheet metal screws, glue, welding, or the like.

Figure 3:
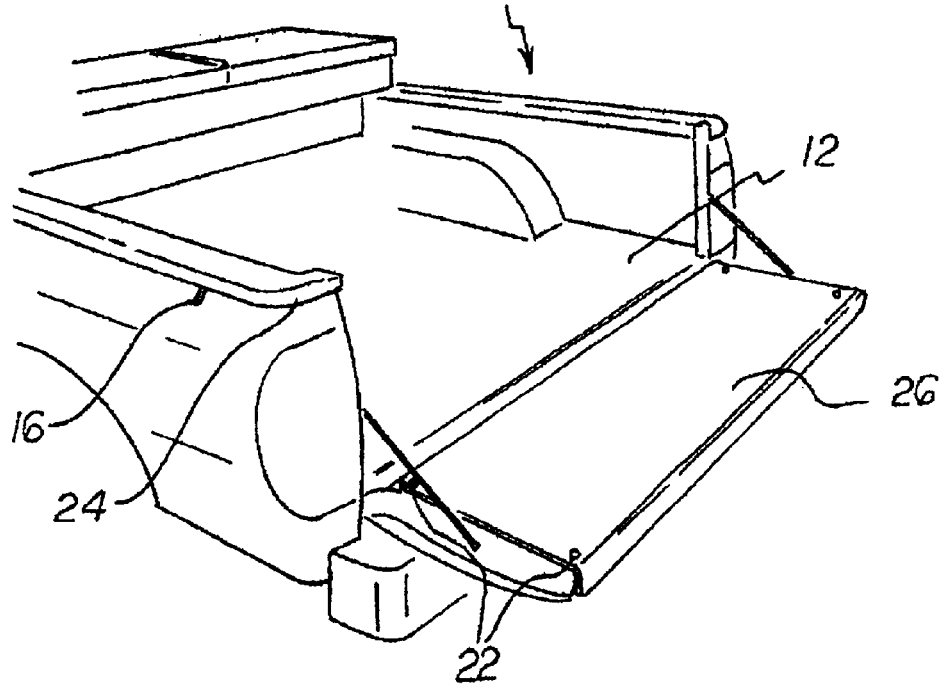

Turning to FIG. 3, shown therein an illustration of the present invention 10 shown in operative connection onto the bed 12 of a pickup truck. Shown are a plurality of tie down hooks 26 disposed about the outer perimeter in a spaced apart relationship onto the upper edge of the sides of the bed of the pickup truck. Also shown are a plurality of means 23 which are used as attachment means for connecting the present invention to the upper edges and tailgate of the pickup truck bed. Also shown are contoured corners 24 of the present invention 10 about the corners of the pickup bed 12. Also shown is the tailgate skin 26 which is of a one-piece design and is designed and placed onto the tailgate of the pickup truck so as to protect and stiffen the tailgate.

Figure 4:
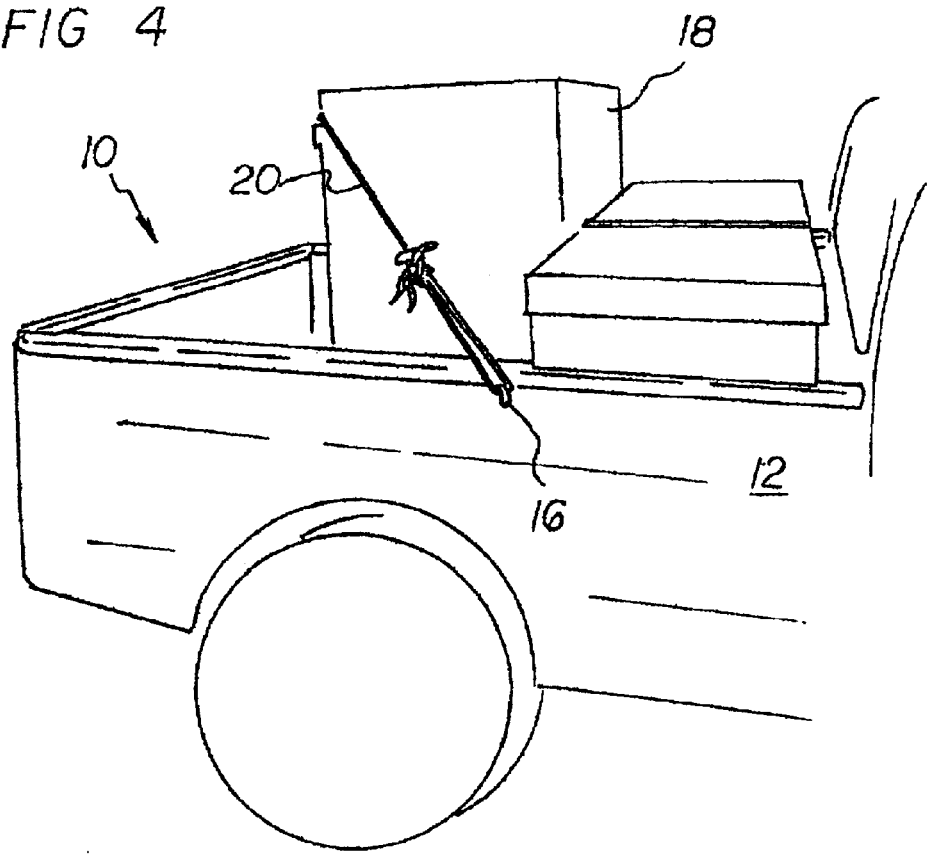

Turning to FIG. 4, shown herein is an illustration of the present invention 10 shown in operative connection onto the bed 12 of a pickup truck. Shown are a plurality of tie down hooks 16 disposed about the outer perimeter in a spaced apart relationship onto the upper edge of the bed of the pickup truck. Also shown is an object 18 being held in place by a plurality of ropes 20 which are tied to the tie down hooks 16. Note that the present invention 10 is comprised of approximately 3/16 inch aluminum or 3/16 inch thick diamond plate steel or the like and is designed and shaped and to be complementary to and contoured to the shape of the bed of the pick up truck.

Figure 5:
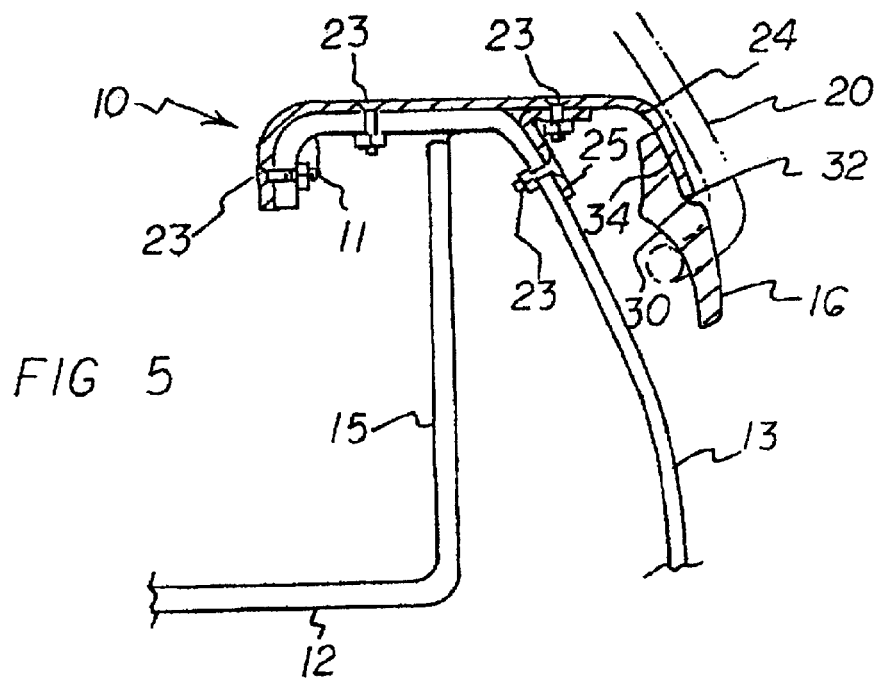
FIG. 5 is a cross section of the present invention mounted on one rail of a typical pickup truck.

Turning to FIG. 5, shown therein is a cross sectional drawing of the present invention 10 in operative connection onto the bed 12 of a pickup truck. Shown is a single, downwardly extending, external tie down hook 16 with a single rope 20 operatively passed around said hook 16. The outside contoured edge 24 is configured to spread the load over at least about one quarter of said radiuses edge 24 and thus reduce the maximum point stress in prior art interior or top-mounted tie down means.

Retention curve 30 positions said rope 20 below the lower of said tie down hook 16. Thus said downwardly extending, external hook holds rope 20 securely without threading an eye or looping a cleat as in prior art tie down means. A working pickup truck and its operator are most efficient when the time to securely tie down a load is minimized. Threading an eye or lashing to a cleat, particularly with extended continuous, ropes, is more time consuming than simply looping around and executing a single terminal tie down.

Tie down hook 16 is attached to the present invention 10 along intersection 34. A typical attachment means is welding the hook 16 to the present invention 10 along intersection 34.

In FIG. 5 is shown an optional reinforcing bracket 25 attached both to the truck body 13 and the present invention. Typical attaching means are counter sunk bolts and nuts. Counter sunk bolts are preferred because there are no protruding edges to catch on and the aesthetics of the rail is enhanced. Other attachment means, well known in the art are acceptable.

Bed liner 15 can be of any type and does not interfere with the present invention 10.

Figure 6:
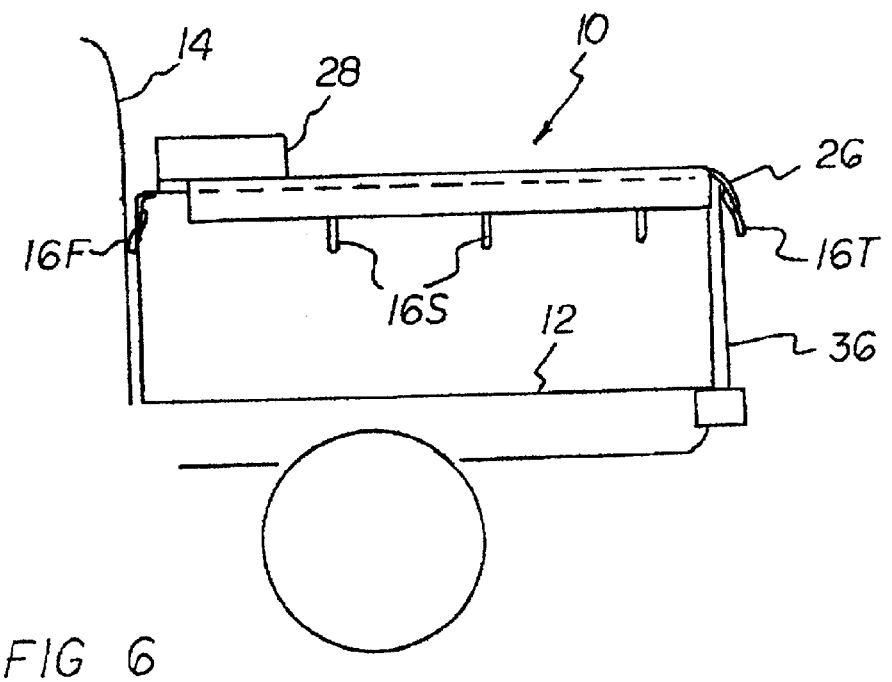
FIG. 6 is a side view of the present invention mounted on the left side of a typical pickup truck.

Turning to FIG. 6, an alternate embodiment of the preferred invention 10 is shown. In this embodiment, the invention 10 is attached to a utility box 28 to form a single unit with additional stiffening capability.

FIG. 6 also shows an optional tailgate skin 26. This skin is attached to tailgate 36 using well known means and allows tie downs on the tailgate by way of hook 16-t. Attached to utility box 28 are front hooks 16-f. Front hooks 26-f and side hooks 16-s allow tie downs in all directions.

Figure 7:
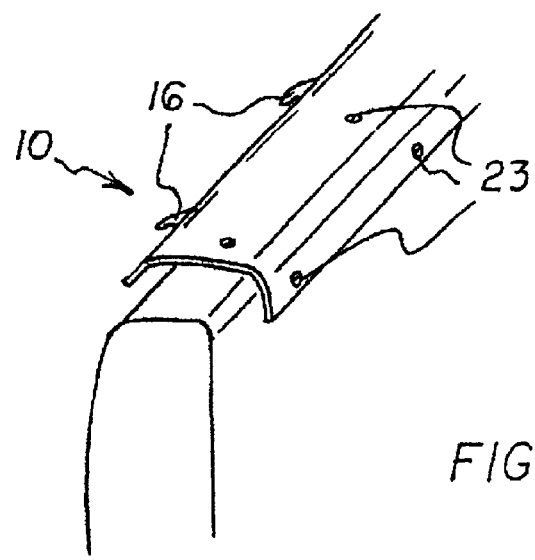
FIG. 7 is an orthogonal view of the top of the present invention mounted on the left side of a typical pickup truck.

FIG. 7 is an orthogonal view of invention 10 showing side and top attachment means 23 and side hooks 16.

Figure 8:
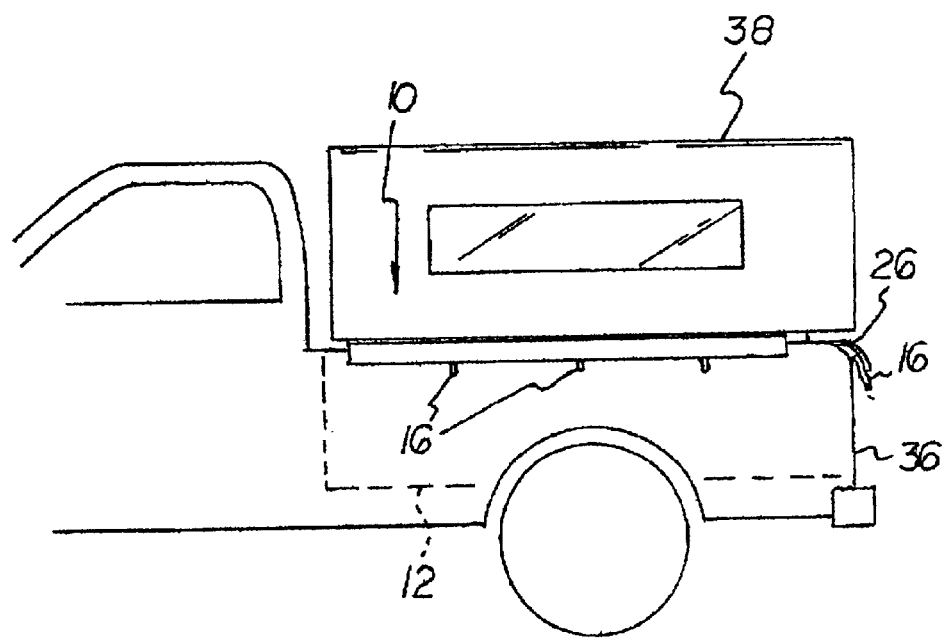
FIG. 8 is a side view of the present invention with an optional camper shell.

FIG. 8 shows an optional camper shell 38 sitting in bed 12 without interfering with side tie down rails 10 or tailgate skin 26.

From the foregoing it can be seen that the invention is a modified pickup truck bed rail cover system 10. A pickup truck 14 has a bed 12 and tailgate 36. The bed has a pair of walls each with an upper rail, an inside surface 11 and an outside surface 13. The tailgate has a tailgate rail, an inner tailgate surface and an outer tailgate surface. The tailgate is pivotable between an open position and a closed position.

An upper rail cover formed of solid reinforced steel is provided. The upper rail cover has a top face and an inside edge and outside edge. The upper rail cover is coupled to the upper rail of the bed. The outside edge of the upper rail cover has a plurality of downward tie hooks 16, 16-s, 16-t, 16-f evenly spaced along the outside surface of the bed walls.

Next provided is a tailgate rail cover. The tailgate rail cover is continuous with a tailgate skin 26 and formed of solid reinforced steel. The tailgate rail cover has a top face, an inside edge and an outside edge. The inside edge is continuous with the tailgate skin which covers the inside surface of the tailgate and is coupled around a periphery of the tailgate to the inside surface of the tailgate. The outside edge of the tailgate rail cover has a plurality of downward tie hooks evenly spaced along the outside surface of the tailgate.

Finally, a plurality of ropes 20 are provided. The ropes are adapted to retain an object 18 in the bed by looping the rope around and tying to the plurality of downward tie hooks.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described ed in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A modified pickup truck bed rail cover system comprising, in combination:

a pick up truck having a bed and tailgate, the bed having a pair of walls each with an upper rail, an inside surface and an outside surface, and the tailgate having a tailgate rail, an inner tailgate surface and an outer tailgate surface, the tailgate being pivotable between an open position and a closed position;

an upper rail cover formed of solid reinforced steel, the upper rail cover having a top face, an inside edge and an outside edge coupled to the upper rail of the bed, the outside edge of the upper rail cover having a plurality of downward tie hooks evenly spaced along the outside surface of the bed walls;

a tailgate rail cover being continuous with a tailgate skin and formed of solid reinforced steel, the tailgate rail cover having a top face, an inside edge and an outside edge, the inside edge being continuous with the tailgate skin which covers the inside surface of the tailgate and coupled around a periphery of the tailgate to the inside surface of the tailgate, the outside edge of the tailgate rail cover having a plurality of downward tie hooks evenly spaced along the outside surface of the tailgate; and a plurality of ropes adapted to retain an object in the bed by looping the rope around and tying to the plurality of downward tie hooks.

\* \* \* \* \*